United States Patent [19]

Inoue

[11] Patent Number: 4,621,360

[45] Date of Patent: Nov. 4, 1986

[54] CONTROL METHOD OF DATA TRANSFER

[75] Inventor: Toshifumi Inoue, Kyoto, Japan

[73] Assignee: Dainippon Screen Seizo Kabushiki Kaisha, Kyoto, Japan

[21] Appl. No.: 622,789

[22] Filed: Jun. 21, 1984

[30] Foreign Application Priority Data

Jun. 27, 1983 [JP] Japan .................................. 58-114184

[51] Int. Cl.⁴ .............................................. H04J 3/00
[52] U.S. Cl. ..................................... 370/85; 340/825.5
[58] Field of Search ....................... 370/85, 95, 88, 86; 340/825.5, 825.51

[56] References Cited

U.S. PATENT DOCUMENTS

| | | | |
|---|---|---|---|
| 4,301,532 | 11/1981 | Janetzky | 370/85 |
| 4,373,183 | 2/1983 | Means et al. | 370/85 |
| 4,451,881 | 5/1984 | Grice et al. | 370/85 |
| 4,488,218 | 12/1984 | Grimes | 370/85 |

*Primary Examiner*—Douglas W. Olms
*Attorney, Agent, or Firm*—Zarley, McKee Thomte, Voorhees & Sease

[57] ABSTRACT

Transfer of data can be controlled by connecting operation modules, which share a single-circuit data bus line, together by a single-circuit handshake line, allocating the timing of use of the data bus line by time-division techniques in synchronization with a handshake clock when sending out and accepting data among the operation modules, and forming a gate circuit via the handshake line between two of the operation modules, whereby to detect coincidence of a data send ready state and a data accept ready state in the two of the operation modules. The above controlling method permits use of fewer control line, simple pipeline processing, shorter standing time, etc.

2 Claims, 14 Drawing Figures

CONTROL METHOD OF DATA TRANSFER

This invention relates to a method for controlling transfer of data, which method is effective when transferring a single piece of data among a plurality of operation modules for example in a digital picture-processing system or the like so as to obtain prescribed operation results at a high speed.

Figure 1:
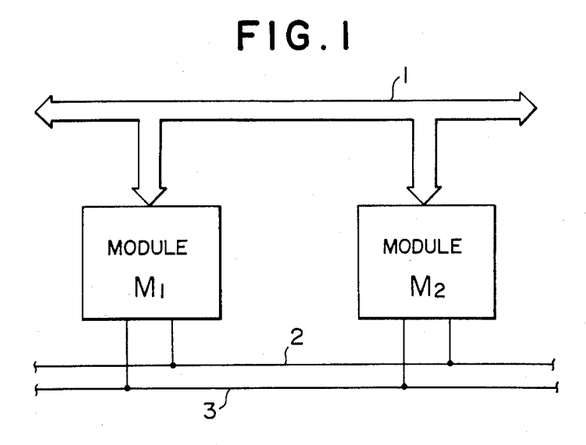
FIG. 1 is a system diagram for transferring data via a two-line handshake.

In FIG. 1, two operation modules $M_1, M_2$ are connected together via a data bus, for example, a G.P.I.B. (general purpose interface bus) 1 which is used as a standard input/output bus. When transferring data through two handshake lines 2,3 while using one of the modules $M_1, M_2$ as a source and the other as an acceptor, the sending-out and acceptance of the data will be carried out in the following manner.

Figure 2:
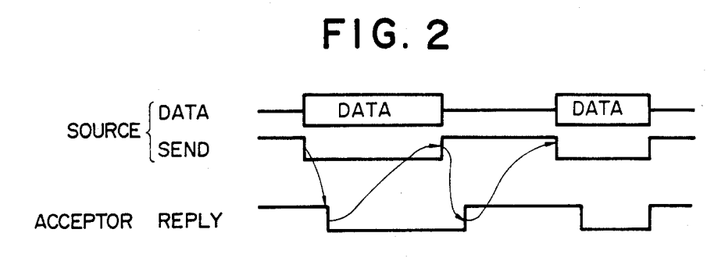
FIG. 2 is a timing chart of the two-line handshake of FIG. 1.

As illustrated in FIG. 2, the source is kept in a state that the datum has been sent out unless the Reply signal turns to "L" (low level). In other words, the falling of the Reply signal means "ready for data". Unless the Reply signal is "H", the source cannot send out the next data. Namely, the rising of the Reply signal means "data accepted".

The sending-out and acceptance of each data is carried out in the above manner in accordance with the speeds of the respective operation modules $M_1, M_2$. Transfer of data through such handshake lines 2,3 is feasible only where a single piece of source and another single piece of acceptor are involved.

Figure 3:
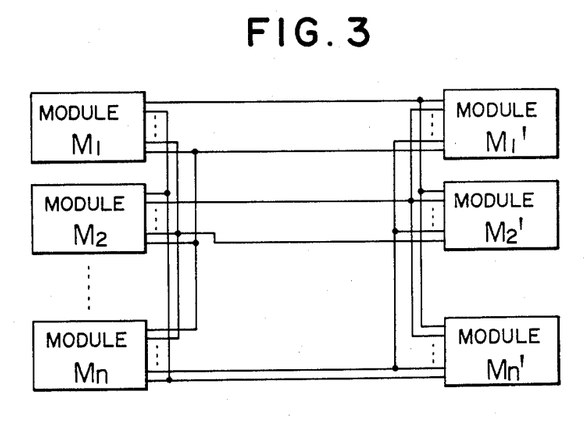
FIG. 3 is a system diagram for transferring data via an expanded crossbar-type handshake.

In order to permit acceptance of signals from a plurality of sources by a plurality of acceptors, it is necessary, for example as illustrated in FIG. 3, to connect source-side operation modules $M_1$–$M_m$ with acceptor-side operation modules $M_1'$–$M_n'$ together by means of handshake lines which are respectively adapted for Send signals and Reply signals.

Figure 4:
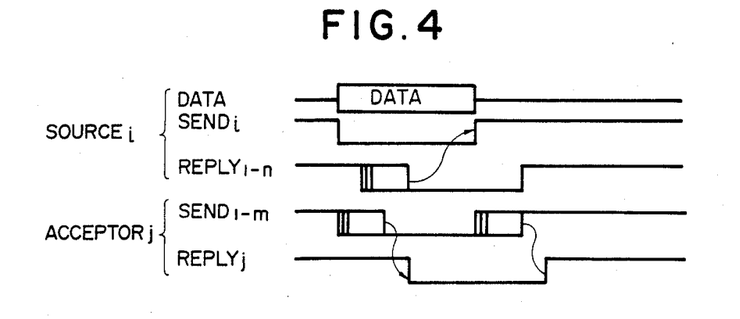
FIG. 4 is a timing chart of the expanded crossbar-type handshake.

When transferring a piece of data for example from a source-side operation module $M_i$ to an acceptor-side operation module $M_j'$ in the above case, the piece of data can be sent out from the source-side operation module $M_i$ by an AND operation of all the acceptors when all the acceptors have been brought into "ready for data" state as shown in FIG. 4. Regarding the "data accepted" state on the other hand, each Reply signal from the operation module $M_j'$ starts to fall after an AND operation of the m pieces of the source-side operation modules on its corresponding Send signal.

Such a crossbar-type two-line handshake method requires lots of wiring in addition to data buses and is moreover difficult to connect additional modules. Since each handshake is established by designating a particular source and acceptor, the above method is accompanied by another drawback that a single-circuit bus line cannot enable pipeline processing by such a plurality of operation modules.

With the foregoing in view, the present invention has as its object the provision of a controlling method of data transfer in which each handshake among a plurality of operation modules is established by connecting the plurality of operation modules via a single-circuit handshake line, and data may be transferred at high speeds among the plurality of operation modules which share a single-circuit data bus line while programmably controlling the counterparts of data sending-out and acceptance and the order of data sending-out and acceptance.

In one aspect of this invention, there is thus provided a method for controlling transfer of data, which method comprises:

connecting a plurality of operation modules, which share a single-circuit data bus line, together by means of a single-circuit handshake line;

in connection with sending-out and acceptance of data among the operation modules, allocating the timing of use of the data bus line by time-division techniques in synchronization with a handshake clock; and forming a gate circuit via the handshake line between two of the operation modules, one of said two operation modules being adapted to send data out to the data bus line and the other being adapted to accept the data from the data bus line, whereby to detect coincidence of a data send ready state in the former operation module and a data accept ready state in the latter operation module.

Namely, source-side operation modules and acceptor-side operation modules, which share a data bus line, are combined in advance so as to use the data bus line by time-division techniques. Then, a Data Send Ready (hereinafter called "DSR") signal and a Data Accept Ready (hereinafter called "DAR") signal are output to a single handshake line, which forms gate circuits respectively with the source-side operation modules and acceptor-side operation modules, from the source-side operation modules and acceptor-side operation modules respectively. By taking an AND of the DSR and DAR signals, the source-side operation modules and acceptor-side operation modules can detect the coincidence of the DSR and DAR signals, thereby permitting transfer of data.

Since the data bus line is used by time-division techniques, it is possible to determine the combination of the source-side operation modules and acceptor-side operation modules in advance and at the same time, to determine the order of sending-out and acceptance of data.

Certain specific embodiments of the method of this invention will hereinafter be described in detail with reference to the accompanying drawings, in which:

FIGS. 1 through 4 are drawings for describing a conventional data-transferring method, namely.

FIGS. 5 through 13 illustrate embodiments of the method of this invention, namely.

Figure 5:
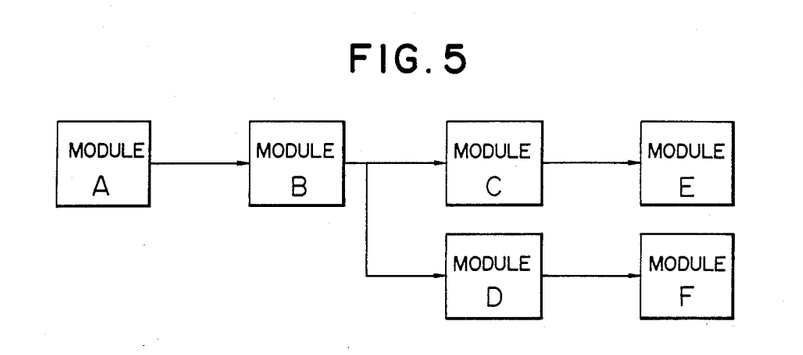
FIG. 5 is a system model diagram showing one embodiment of data flow among a plurality of operation modules in a system controlled in accordance with the method of this invention.

FIG. 5 illustrates a model of data flow in a system adapted to process data by means of 6 operation modules A–F. Each piece of data produced at the module A is sent out to the module B for its processing. Results of the processing are then transferred parallel to the module C and module D, where they are subjected to further processings.

The data, which has been processed at the module C, is transferred to the module E, while the data processed at the module D is transferred to the module F.

Figure 6:
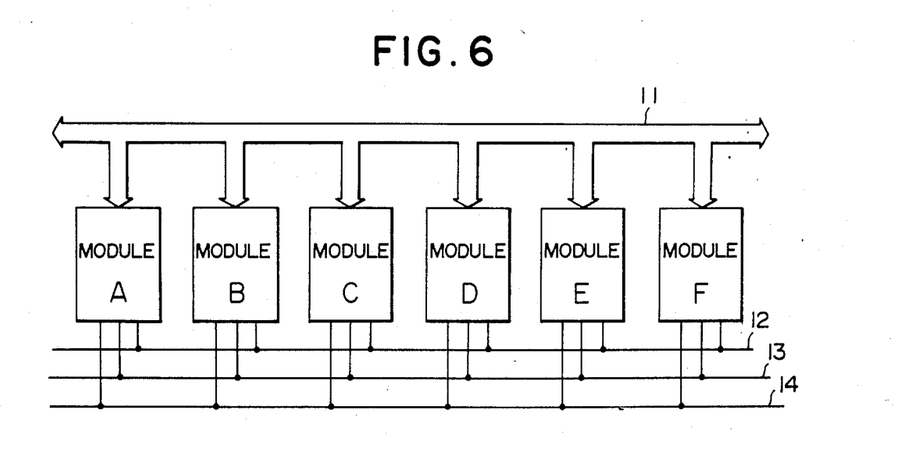
FIG. 6 is a system block diagram illustrating the manner of connection among individual operation modules in a system constructed to practice the method of this invention.

The method of this invention can perform a data transfer suitable for a system having such a data flow as in the above-described model. FIG. 6 is a block diagram of a hardware constructed in such a way that the system of FIG. 5 may be applied to practice of the method of this invention.

The modules A–F are commonly connected to a single-circuit data bus line 11 which can convey bit-parallel data. Furthermore, the modules A–F are also commonly connected to a single-circuit handshake line 12, a single-circuit handshake clock line 13 and a single-circuit preset data line 14, all of which extend in parallel to the data bus line 11. By the way, the common ground line of the lines 11,12,13,14 is included in the data bus line.

Figure 7:
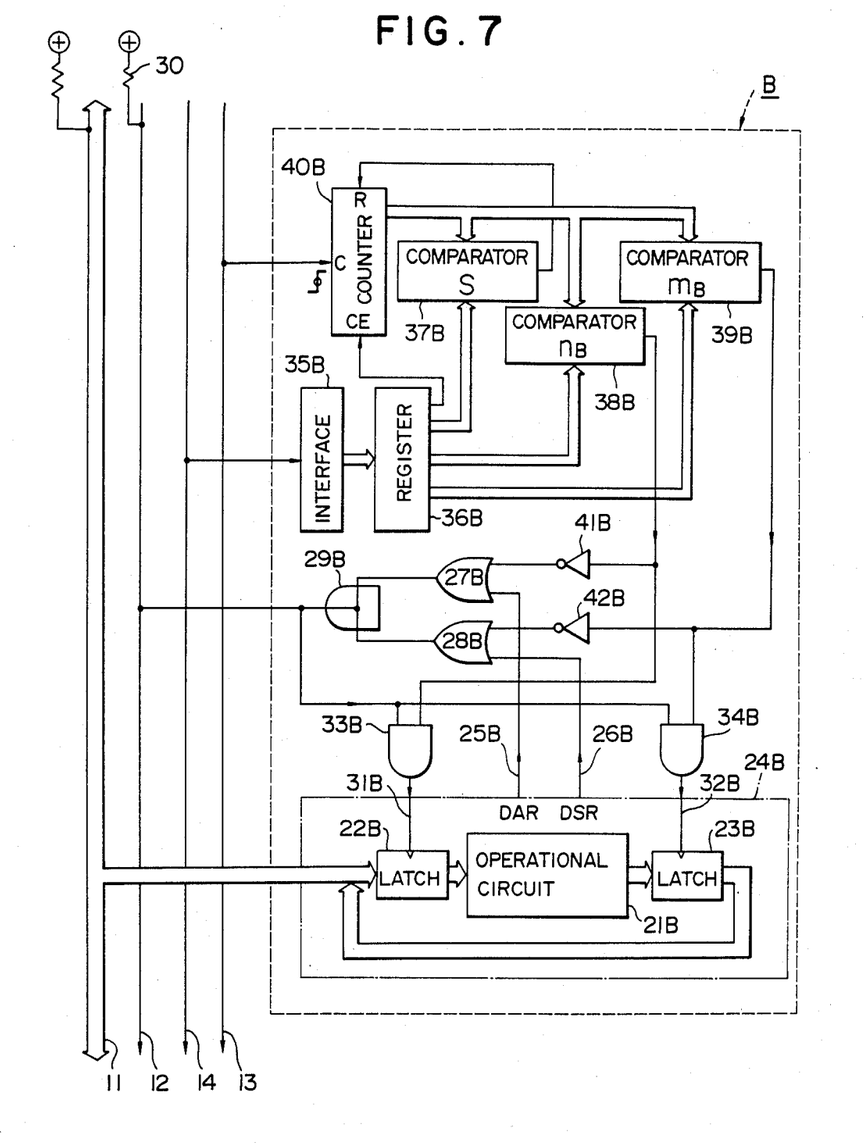
FIG. 7 is an electrical circuit diagram showing one example of a circuit suitable for use in actual practice of the method of this invention, taking one operation module as a representative example.

FIG. 7 illustrates, taking the operation module B as a representative example, a specific example of a data transfer control circuit which is provided with the same circuit structure as the remaining operation modules A–F and is controlled by the method of this invention.

For the sake of explanation of the operation of mutual sending-out and acceptance of data, the circuits of the unillustrated modules A and C–F will be described by indicating their individual devices in terms of their reference numerals in combination with alphabetical reference letters representing respective modules.

In the operation module B, an operation circuit 21B having a prescribed data-processing function is connected in such a way that it can accept data from the data bus line 11 via an input latch 22B and send data out to the data bus line 11 by way of an output latch 23B.

An operation unit 24B containing the operation circuit 21B and both latches 22B,23B performs data processing by means of a micro-computer or the like which operates in accordance with its own clock. Upon completion of the data processing, a DAR and DSR signals are output at levels "H" and with suitable timing to their respective output terminals 25B,26B.

The DAR terminal 25B and DSR terminal 26B are connected respectively to one input terminals of OR gates 27B,28B which are equipped with open collector type output terminals.

The output terminals of both OR gates 27B28B are connected together to form a wired AND connection 29B, which is in turn connected to the handshake line 12. This handshake like 12 is connected at a suitable location thereof to a line of the level "H" by way of a pull-up device 30.

The wired AND connection 29B, formed at the output terminals of the OR gates 27B,28B of the open collector output type, and the pull-up device 30 forms a wired AND gate circuit by way of the handshake line 12, whereas wired AND connections 29A,29C, . . . ,29F at the other modules A,C, . . . ,F form an expanded wired AND gate circuit by way of the handshake line 12 relative to the AND gate circuit of the module B.

The output latch 23B which will be described later also outputs a signal at the "H" level when a signal has already been output from the output terminal of and AND gate 34B of the open collector type and a latch input 32B is kept at the "L" level. Where the OR gates 27B,28B are formed using gate devices or three state devices which can output both of usual source mode and sink mode, it may be possible to form, in the handshake like 12, a diode AND gate circuit which can isolate each source output from the handshake line (expand common line) 12 by reversing the polarity of the diode.

The wired AND connection 29B, namely, the handshake line 12 is connected respectively to one input terminals of AND gates 33B,34B provided respectively with latch-controlling input terminals 31B,32B of both latches 22B,23B.

The preset data line 14 is connected to a serial interface 35B which interpretes a special code predetermined for itself, for example, for the module B from series-hit data fed to the preset data line 14 and then accepts preset data. The interface 35B delivers the thus-accepted preset data to a register 36B.

The register 36B stores preset data which have been accepted in a serial order and outputs the data in a bit parallel fashion. The thus-output data are divided and then fed to a plurality of comparators 37B,38B,39B.

The preset data are determined in advance module by module. Their contents are fed as many as the frequency S of data transfer within a time-division cycle (hereinafter called "bus cycle") T of the data bus line 11 which is used by time-division techniques. During the bus cycle T, the data bus line 11 is allocated in accordance with numbers attached to time-divided portions of the bus cycle T.

Data sending-out timing numbers n and data acceptance timing numbers m are both represented in terms of binary codes and are arranged in series as data.

In the model of FIG. 5 for example, it is necessary to give four chances to transfer each data (S=4). The numerals n,m, which determine the timing of sending-out and acceptance in accordance with counterparts of communication, may for example take the following values:

| Module A | S = 4 | $n_A$ = MAX | $m_A$ = 0 |
| Module B | S = 4 | $n_B$ = 0 | $m_B$ = 3 |

| | | -continued | |
|---|---|---|---|
| Module C | S = 4 | $n_C = 3$ | $m_C = 2$ |
| Module D | S = 4 | $n_D = 3$ | $m_D = 1$ |
| Module E | S = 4 | $n_E = 2$ | $m_E = $ MAX |
| Module F | S = 4 | $n_F = 1$ | $m_F = $ MAX |

By the way, the module A does not require any chance of acceptance because it accepts signals from the outside (i.e., as a sort of I/O interface) or produces internally by itself. Therefore, the value n which governs the timing of acceptance is set at a value greater than the value of S, for example, at S=MAX which is the possible maximum value for the value S.

Similarly, the modules E,F do not require any chances of sending-out respectively at $m_E$=MAX and $m_F$=MAX and no acceptance timings are given to them at these values, because they can either send signals out to the outside (i.e., each being as a sort of I/O interface) or store signals internally.

It becomes unnecessary to set the acceptance timing $n_A$ of the module A provided that the comparators 38B, AND gate 33B, input latch 22B, inverter 41B and OR gate 27B are removed from such a data transfer control circuit provided with the module A as shown in FIG. 7.

Since the modules E,F are not required to send signals out, the comparator 39B, AND gate 34B, output latch 23B, inverter 42B and OR gate 28B are also unnecessary and may thus be removed from the circuit illustrated in FIG. 7. In this case, it becomes unnecessary to set the values $m_E$ and $m_F$.

As a method for providing such preset data, the preset data line 14 may be formed into either a plurality of lines or a single line. When using a single line, preset data may be given in such a manner that some of a number of bit strings are rendered incapable of bearing data and data are given respectively from bits separated by certain numbers from such data-unbearable bits.

For example, a 16-representation signal is generally composed of 4 bits. Special bits and data bits may be distinguished from each other if one extra bit is specifically added to each 16-representation signal to represent it by 5 bits and the fifth bits of data signals are all set at "L" and the fifth bits of special bits are set at "H" without failure. Namely, these special bits may be assigned to act as special presetting bits when five straight "H" bits appear after one "L" bit. On the other hand, they may be assigned to serve as special bits (CE) for count initiation when one "L" bit is followed by ten straight "H" bits. Data bits, which follow such special bits, are then accepted in the register 36 and are thereafter output as module selection bits, comparator data or count-starting signals.

The above-described processing may be performed in accordance with a suitable known technique and is not a direct object of this invention. It will thus not be described in further detail. By the way, the preset data may be input from digital switches or the like by connecting the system directly with a console.

A clock input terminal C of a counter 40B is connected to the handshake line 13. Each count data of the counter 40B is fed parallel to the comparator 37B,38B,39B.

The comparator 37B, in which a value S has been preset, delivers its coincident output to a reset terminal R of the counter 40B. Thus, the counter 40B and comparator 37B make up a programmable S-representation counter.

The comparator 38B, in which a value $n_B$ has been preset, sends its coincident output to the other input terminal of the AND gate 33B and at the same time, delivers it to the other input terminal of the OR gate 27B by way of an inverter 41B.

On the other hand, the comparator 39B in which a value $m_B$ has been preset gives its coincident output to the other input terminal of the AND gate 34B and at the same time, feeds the same to the other input terminal of the OR gate 28B via an inverter 42B.

The coincident outputs of the comparators 38B,39B are both sent out at "H" levels, whereby to allow both inverters 41B,42B to output "H" levels when the value of the counter 40B is other than the present values $n_B,m_B$ of the comparators 38B,39B. Therefore, the OR gates 27B,28B always output signals at "H" levels to the handshake line 12 irrespective of the output level of the DAR or DSR signal. Accordingly, the level of the DAR or DSR signal can be reflected to the handshake line 12 only when either one of the comparators 38B,39B outputs a coincident signal at "H" level.

In addition, when a coincident signal of "H" level is in turn output from the comparator 38B, the handshake line 12 is at "H" level so long as the DAR signal is of "H" level and all the remaining modules output signals at "H" levels. On the other hand, the AND gate 33B outputs a signal at "H" level. It is here that the latch 22B accepts from the data bus line 11 data which are loaded on the bus line, in other words, data which have been sent out from the remaining modules to the data bus line.

When a coincident signal of "H" level is on the other hand output from the comparator 39B, the handshake line 12 is kept at "H" level so long as the DSR signal is of "H" level and all the remaining modules output signals of "H" level. Furthermore, the AND gate 34B outputs a signal of "H" level, while the latch 23B latches data, which has been fed from the operation circuit 21B at that time, and sends out the thus-latched data to the data bus line 11.

When both or either one of the DAR and DSR signals are at "L" levels and the modules have not been rendered ready for acceptance or sending-out, the "L" levels are reflected to the handshake line 12 so that the handshake line 12 is changed down to "L" level. Accordingly, the AND gates 33B,34B and the AND gates 33X,34X of their communication counterpart modules X (where X=A, C, D, E and F) are closed, thereby not performing mutual data communications.

In the embodiment illustrated in FIG. 7, the sending-out and acceptance of data are carried out via a single handshake line between a source-side operation module $m_X$ and its corresponding acceptor-side operation module $n_{X'}$, the setting values of which operation modules are equal to each other, by maintaining the handshake line 12 at "H" level as mentioned above.

As conditions for the above sending-out and acceptance of data, it is important that the source-side operation module $m_X$ and the acceptor-side operation module $n_{X'}$ have the same setting value, the source-side operation module $m_X$ outputs the DSR signal at "H" level, the acceptor-side operation module $n_{X'}$ outputs the DSR signal at "H" level, both comparators 38,39 are neither $m_X$ nor $n_{X'}$ with respect to the remaining operation modules which do not perform sending-out or acceptance, all the operation modules have the same value as the value S, and the counter 40 shows the same value for each of the operation modules.

Then, the DAR and DSR signals are reflected after AND-processed on the handshake line 12.

Figure 8A:
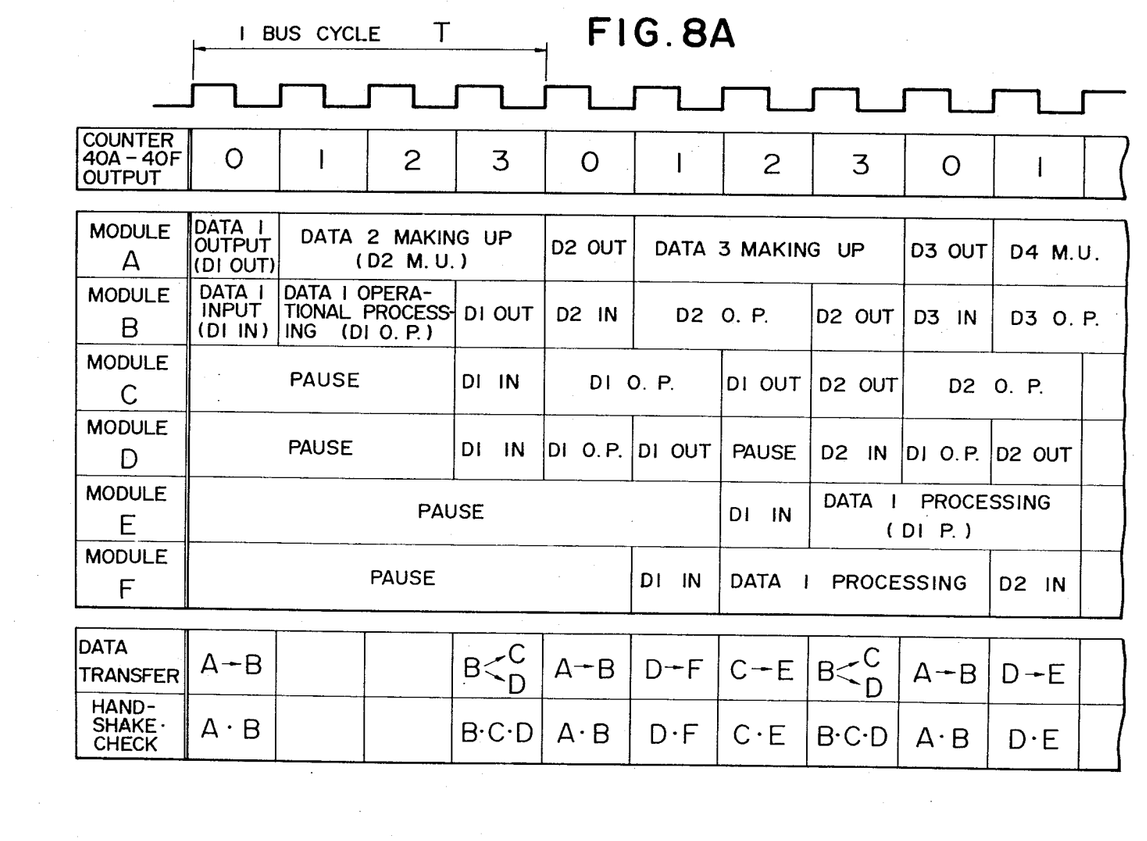
FIG. 8A is a time chart pertaining to sending-out and acceptance of data in one embodiment in which it is designed to obtain a data flow of the model shown in FIG. 5 by means of the circuit of FIG. 7.
Figure 8B:
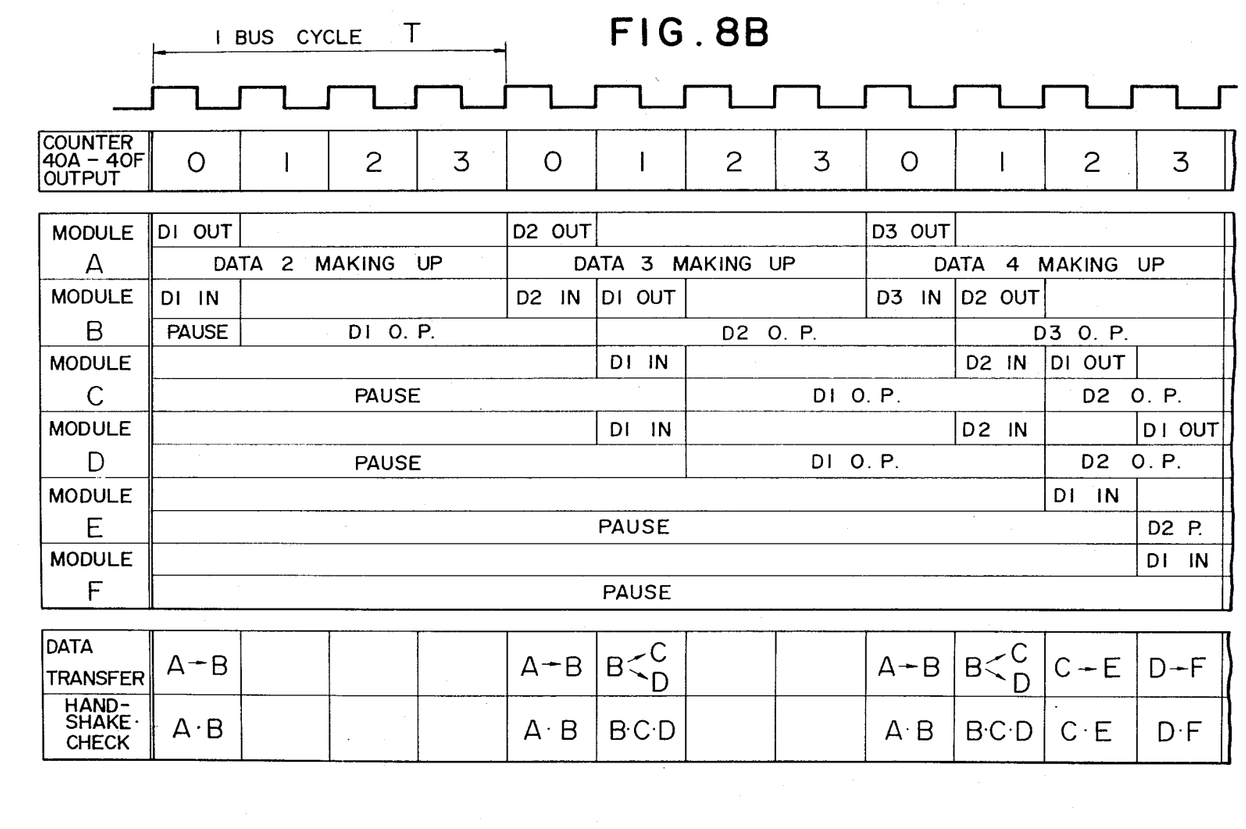
FIG. 8B is a time chart similar to FIG. 8A, which pertains to another embodiment in which the operation block of FIG. 7 is equipped with a latch circuit at its output portion.

FIGS. 8A and 8B are time charts illustrating data transfer routines, which are different from each other, upon transferring data by the model of FIG. 5 which is controlled by the circuit of FIG. 7 in the above-described manner.

The time chart of FIG. 8A is now described. When the handshake synchronization clock is "0", data is output from the module A and is then input to the module B. At the module B, the thus-input data is subjected to an operation. When the handshake synchronization clock is "3" after throughput of the operation, the resulting processed data is output and the modules C,D accept the thus-output data.

Sending-out and acceptance of data between the other modules are carried out in the same manner.

Similarly, data operation processings at the modules C-F are carried out in accordance with the above-described chart.

In the time chart shown in each of FIG. 8A and FIG. 8B, the frequency of the synchronization clock is chosen in such a manner that the maximum throughput in either one of the modules A-F falls within two or three cycles of the synchronization clock. Such a frequency permits parallel performance of up to three operations during a single bus cycle T and allows at most four sending-out and acceptance operations of data, also, during the single bus cycle T.

In the embodiment illustrated in FIG. 8A, it is necessary to determine the input and output timing while taking the throughputs of the modules A-F into consideration.

For example, a throughput of "T/2" is required for the module B while the module D requires a throughput of "T/4" only.

Therefore, it is necessary to make the bus cycle T longer in the above-described embodiment when many operation modules, each having a long throughput, are combined or when still more operation modules are used.

As one example of countermeasures for such a situation, it may be contemplated to use, as the operation block 21B of FIG. 7, an operation block equipped in advance with a circuit adapted to latch each operation result.

In this case, the operation-processed data is latched at the latch circuit of the operation block 21B and is then transferred to the latch 23B in synchronization with the output timing of data. Therefore, it is possible to accept the next data and to subject the same to an operation even while the outputting data is still in the output latch 23B.

FIG. 8B illustrates the operation of each of the operation modules A-F when the operation block 21B is equipped with a latch circuit and the throughput of each of the operation modules A-F has a length equivalent to four clocks.

The following sending-out and acceptance timings are allocated by way of example to the individual operation modules A-F:

| Module A | S = 4 | $n_A$ = MAX | $m_A$ = 0 |
| Module B | S = 4 | $n_B$ = 0 | $m_B$ = 1 |
| Module C | S = 4 | $n_C$ = 1 | $m_C$ = 2 |
| Module D | S = 4 | $n_D$ = 1 | $m_D$ = 3 |
| Module E | S = 4 | $n_E$ = 2 | $m_E$ = MAX |
| Module F | S = 4 | $n_F$ = 3 | $m_F$ = MAX |

A further description will now be made with reference to FIG. 8. When the count value S of the counter 37B is "0", Data 1 is output from the operation module A and is then accepted in the operation module B. At the operation module B, an operation processing is performed on Data 1 while the count data S changes from "1" to the next "0". Results of the operation processing is stored in the latch circuit of the operation block 21B.

On the other hand, at the timing where the count value S is "0", the operation module B accepts Data 2 from the operation module A.

At the next timing where the count value S is "1", Data 1 is transferred from the latch circuit of the operation block 21B to the latch 23B, followed by its sending-out to the operation modules C,D. This procedure will be repeated in the same manner.

Accordingly, the time chart of FIG. 8B is different from that of FIG. 8A in that the former time chart permits a reduction to effective processing time and establishes the bus cycle T with a length of a frequency T equivalent to four clocks in much the same way as the embodiment shown in FIG. 8A because after the latch circuit of the operation block 21B has stored Data 1 therein, the next data, namely, Data 2 can be accepted and processed.

As has been described above, the embodiment of FIG. 8B allows to determine the input and output timings of data while including the throughputs of the individual operation modules A-F in the transfer time of data and thus paying no attention to the throughputs of the individual operation modules A-F.

Even when the system is complex and its operation modules A-F have relatively long throughputs, the embodiment of FIG. 8B is effective since it can make the bus cycle T equal to the throughputs.

In the above-described embodiments, the preset data line 14 is used to feed preset data and starting signals to the registers 36A-36F of the modules A-F. The preset data line 14 is used when the system is initialized. It practically becomes an unnecessary line when transferring data. Therefore, the preset data line 14 may be omitted by using the handshake line 12 for both purposes, thereby making it possible to reduce the number of control lines.

In the above-described embodiments, the input and output times of data are always determined at the constant level of T/S as shown in FIG. 8A and FIG. 8B. In a system making use of many operation modules A-F as in the model of FIIevel of T/S as shown in FIG. 8A and FIG. 8B. In a system making use of many operation modules A-F as in the model of FIG. 5, the throughputs of the individual operation modules A-F are in many instances different to considerable extents, in other words, the individual operation modules A-F have in many instances both long and short throughputs in combination.

Therefore, the throughput of the overall system may be improved by making it possible to determine the input, output and transfer times of data programmably in accordance with the throughputs of the individual operation modules A-F, especially, in the embodiment of FIG. 8A.

Figure 9:
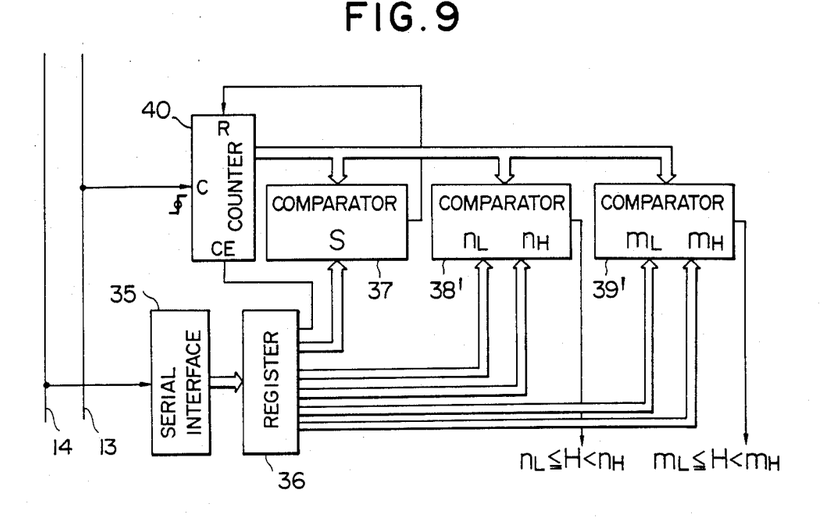
FIG. 9 illustrates a further embodiment, namely, is an electrical circuit diagram illustrating some modifications to the circuit shown in FIG. 7.

FIG. 9 illustrates a further embodiment in which the transfer time of data has been made programmable between each two modules. This further embodiment is slightly different from the embodiment shown in FIG. 7 with respect to the contents of preset data, the frequency of the handshake clock and the comparators 38B,39B but is identical in other aspects.

The frequency of the handshake clock in the embodiment of FIG. 9 is set at a level at least ten times the level employed in the embodiment illustrated in FIG. 8A.

A comparator 38' which governs the timing of acceptance is a window-type comparator. The timing of acceptance is determined by the lower limit $n_L$ and upper limit $n_H$ of the window. On the other hand, the time period of acceptance is determined by its window width ($W = n_H - n_L$). A coincident signal of "H" level is output when the count data of the counter 40 falls within the window width W.

Similarly, a comparator 39' which governs the timing of sending-out may be of the window type. The timing of sending-out and the time period of sending-out are determined respectively by the lower limit $m_L$ and upper limit $m_H$ and the window width ($W = m_H - m_L$).

The value S of the comparator 37 is set at a level equal to the total value of the window widths of the comparator 39', which window widths pertain respectively to the sending-out of data from the modules A–F.

It is therefore possible to carry out, by setting the window widths W of the comparators 38',39' as desired, transfer of data in such a way that the sending-out time periods between the individual modules have been determined as desired.

By the way, the setting values $n_L, n_H$ and $m_L, m_H$ of both comparators 38',39' are sent as preset data to the shift register 36 from the preset data line 14.

In addition, the data transferring method of this invention facilitates addition of operation modules, change to the processing order and skip of certain processings.

Figure 10:
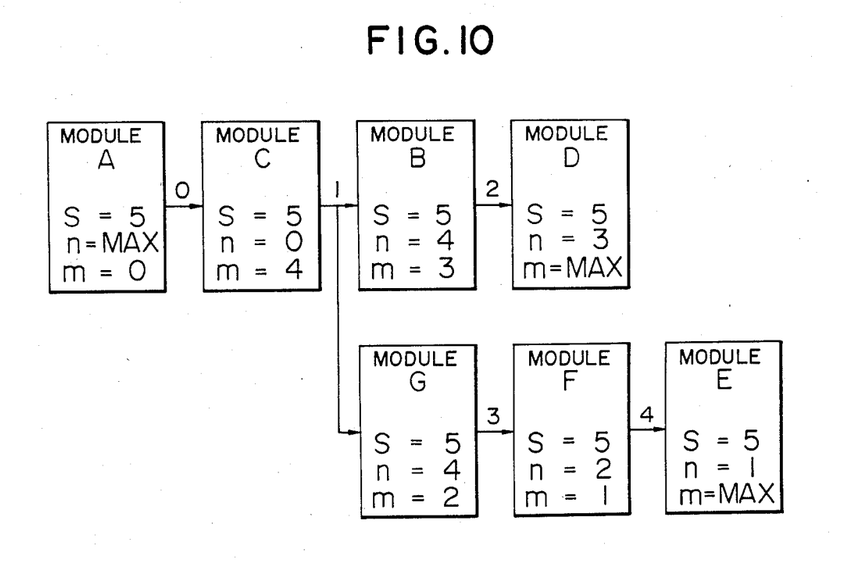
FIG. 10 is a model diagram of a new system constructed by adding new operation modules to the system of FIG. 5 so as to change the flow of data.

In order to add a new operation module G to the system of FIG. 5 so as to change the flow of data as illustrated in FIG. 10, it is only necessary to set the contents of the preset data in such a way that the values shown in each of the blocks, which correspond respectively to the operation modules A–G, become S, n and m.

Furthermore, the values $n_X, m_X$ of each operation block which is not to be used may individually be set at MAX.

Figures 11, 13:
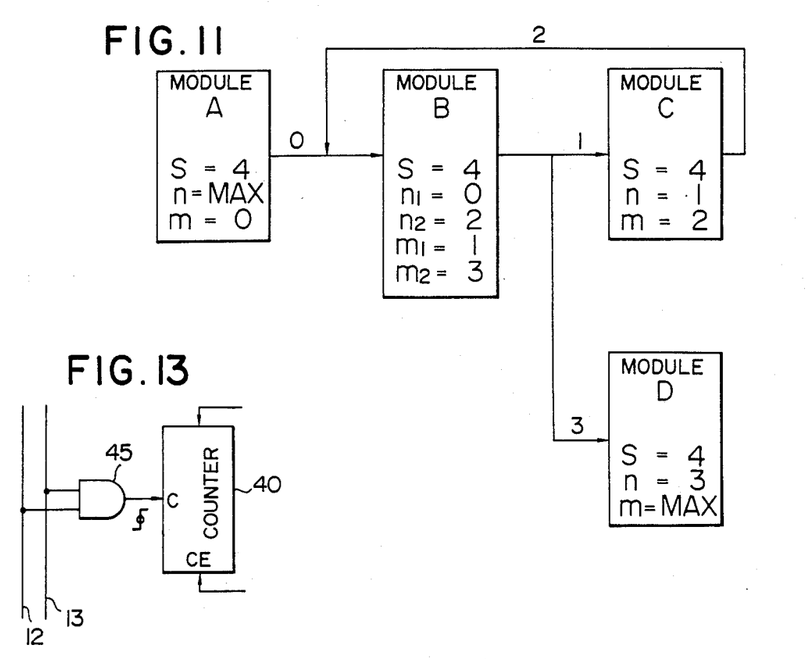
FIG. 11 is a model diagram of a system in which data flow along a loop.
FIG. 13 is an electrical circuit diagram illustrating accessory means for transferring data piece by piece without failure in the method of this invention.

FIG. 11 illustrates a system model in which data is caused to flow in a loop. When the flow of data is changed into a loop, the module B can perform two types of operational processings.

The first operational processing of the module B is, in a single bus cycle, to process data once at the module B and then to transfer the thus-processed data to the module C for its further processing, and thereafter to feed the resulting data back to the module B; and in the next bus cycle, to add the data of the module C to the data transferred from the module C and then to process the resultant data at the module B. In the second operational processing, the module B serves as two modules and performs practically data processing without exhibiting any feedback effect.

Figure 12:
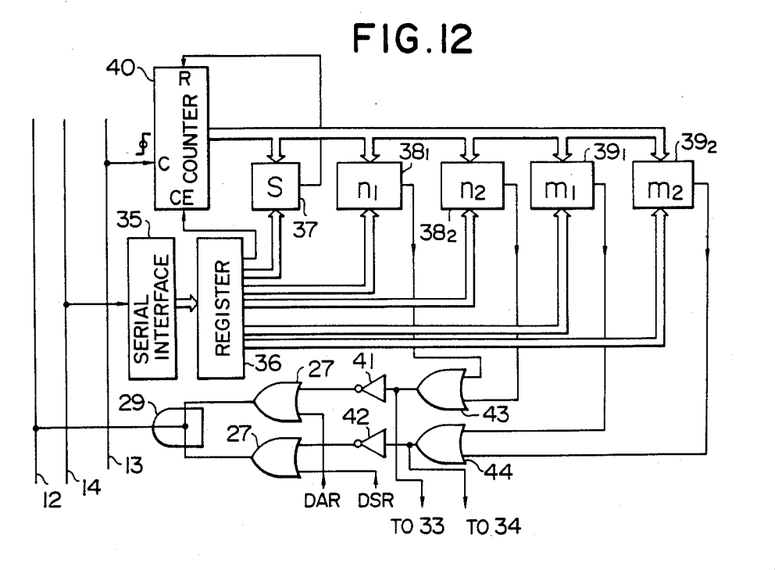
FIG. 12 is an electrical circuit diagram of a still further embodiment which is partly different from the embodiment shown in FIG. 7 and is useful in the practice of the system of FIG. 11.

FIG. 12 is a circuit diagram of an essential part of the above-described embodiment which converts the flow of data into a loop. In this embodiment, comparators equivalent to the comparators 38B,39B shown in FIG. 7 are provided in pairs as acceptance timing comparators $38_1, 38_2$ and sending-out timing comparators $39_1, 39_2$.

The acceptance timing comparators $38_1, 38_2$ deliver their coincident outputs to both input terminals of an OR gate 43. The resulting output from the OR gate is then fed to the AND gate 33 and an inverter 41.

Similarly, the sending-out timing comparators $39_1, 39_2$ deliver their coincident outputs to both input terminals of an OR gate 44. Thereafter, the resultant output from the OR gate is delivered to the AND gate and an inverter 4t terminals of an OR gate 44. Thereafter, the resultant output from the OR gate is delivered to the AND gate and an inverter 42.

Similar to the combination of the lower limit and upper limit of a window in FIG. 9, two pieces of data $n_1, n_2$ and additional two pieces of data $m_1, m_2$ are determined as preset data respectively for acceptance and sending-out. These values are stored as one-word data in the register 36, in combination with the setting value S of the comparator 37.

When a loop is however formed for the transfer of data in the above manner, not all the modules are used to make the loop. When each of the modules is constructed into such a circuit structure as shown in FIG. 11, some of the modules may have unnecessary comparators and the word length of the preset data becomes unnecessarily long.

The above problem may however be overcome if the module shown in FIG. 7 is used as the module B which is contained in the loop, an interface 35Y and register 36Y which are to be provided with another module, for example, with the additional module Y are provided with the module 11 so as to make the module B into the same circuit as that shown in FIG. 11, and the preset data is rendered similar to that suitable for a system similar to that shown in FIG. 7 but additionally including the module Y.

In each of the above-described embodiments, the transfer of data may be brought to the subsequent bus cycle and more waiting time may be required depending on the type of processing, when the DAR and DSR signals are not coincided between a sending-out module and its corresponding acceptance module designated by time-division techniques.

FIG. 13 shows a further embodiment which can exhibit a function capable of waiting for coincidence of the DAR and DSR signals. An AND gate 45 is provided with the clock input line of the counter 40 and both input terminals of the AND gate 45 are connected respectively to the handshake line 12 and handshake clock line 13, whereby to stop the counting of the counter 40 when either one of the DAR and DSR signals of a sending-out and acceptance modules has dropped to "L" level.

Similar results may also be obtained when the generation of clock signals is effected at the generation unit of handshake clock signals in accordance with signals on the handshake line 12.

The method of this invention can, as described above, synchronize the timings, at which DSR and DAR signals are judged, in accordance with the handshake clock and at the same time, permits efficient transfer of data by virtue of a handshake which shares the bus line by time-division techniques.

When transferring data among operation modules adapted to perform a series of operations, such as generation of addresses, memory reading-out, data exchange, memory writing-in and the like for example, the memory is commonly shared by both reading module and writing module. In this case, one of the operation modules cannot get any access to the memory and has to kept standing by while the memory is accessed by the other operation module.

When making a display from the memory for example to a CRT, each writing-in operation to the memory has to get an access to the memory within the display blanking time period of the CRT. Such a writing-in operation is also required to stand by when data is transferred. The method of this invention is not required to use any complex timings in such a case and moreover, permits simple pipeline processings while making it possible to reduce the number of control lines and sharing the data bus line.

On the other hand, each operation module is equipped with latches respectively at its input and output terminals. Thus, the time required for each input or output may be shortened (to a significant extent). Furthermore, the sending-out and acceptance of data may be effected without need for taking the throughput of each operation module into consideration when the handshake clock is set at a higher frequency level.

The above-described standing time was as long as the standing time T because it is necessary to wait for the next bus cycle. However, the bus cycle T' can be rendered to an extremely short time T' compared with the throughput by adjusting the clock to a high frequency. Thus, the standing time requires only the bus cycle T' of the extremely short time period, thereby making it extremely shorter compared with the long bus cycle T.

When transferring data for example only during the blanking time period of a CRT display in which data having various densities flow through the system, many pieces of data may be sent-out and accepted in a short period of time between specific operation modules while high-density data is processed (during a blanking time period) if buffer memories of the first-in/first-out type are respectively built in the downstream of the input latch and the upstream of the output latch in each operation module. This feature can bring about greater advantageous effects as the throughputs of the modules become greater.

The setting values n,m of the comparator 38,39 may be set by setting the values n and m of operation modules, between which one wants to send out and accept data, at the same level. Thus, there is a little necessity to take standing time into consideration.

In addition, an application of the method of this invention facilitates synchronous piece-by-piece transfer of data without failure.

Having now fully described the invention, it will be apparent to one of ordinary skill in the art that many changes and modifications can be made thereto without departing from the spirit or scope of the invention as set forth herein.

What is claimed is:

1. A method for controlling transfer of data, which method comprises:
    connecting a plurality of operation modules, which share a one way data bus line, together by means of a one way handshake line;
    allocating the timing of use of the data bus line for sending and accepting data among each of the operation modules;
    forming a gate circuit, including the handshake line, between two of the operation modules, which can detect coincidence of a data send ready state of one of said two operation modules which is adapted to send data out to the data bus line and a data accept ready state of the other operation module which is adapted to accept the data from the data bus line.

2. A method according to claim 1, wherein an input and output instructions to the two of the operation modules are respectively issued by the detection of the coincidence of the data send ready state and data accept ready state by means of an open collector type transistor circuit capable of operating as a logical AND circuit formed relative to the one-circuit handshake line.

* * * * *